US008985607B2

(12) United States Patent
    Schminkey

(10) Patent No.: US 8,985,607 B2
(45) Date of Patent: Mar. 24, 2015

(54) SINGLE LEVER DRIVE SYSTEM

(71) Applicant: Kevin A. Schminkey, Grand Rapids, MN (US)

(72) Inventor: Kevin A. Schminkey, Grand Rapids, MN (US)

(73) Assignee: Kevin Alan Schminkey, Grand Rapids, MN (US)

( * ) Notice: Subject to any disclaimer, the term of this patent is extended or adjusted under 35 U.S.C. 154(b) by 0 days.

(21) Appl. No.: 13/928,045

(22) Filed: Jun. 26, 2013

(65) Prior Publication Data

US 2014/0306420 A1    Oct. 16, 2014

Related U.S. Application Data

(63) Continuation-in-part of application No. 13/861,355, filed on Apr. 11, 2013, which is a continuation-in-part of application No. 13/860,619, filed on Apr. 11, 2013.

(51) Int. Cl.
    *B62M 1/16*    (2006.01)
    *B62M 1/14*    (2006.01)
    *F16H 21/16*   (2006.01)

(52) U.S. Cl.
    CPC . *B62M 1/14* (2013.01); *F16H 21/16* (2013.01)
    USPC ............................................. 280/245

(58) Field of Classification Search
    USPC .................. 280/244, 245, 246, 247, 248
    IPC ................................................ B62M 1/16
    See application file for complete search history.

(56) References Cited

U.S. PATENT DOCUMENTS

| | | | |
|---|---|---|---|
| 904,062 A | 11/1908 | Hamill | |
| 917,910 A | 4/1909 | Thomas | |
| 1,449,643 A | 3/1923 | Wenderhold | |
| 1,595,857 A * | 8/1926 | Coffman | 280/234 |
| 4,601,482 A * | 7/1986 | Ferez | 280/265 |
| 4,840,076 A | 6/1989 | Brubaker et al. | |
| 4,911,457 A * | 3/1990 | Ishikawa | 280/240 |
| 5,007,655 A | 4/1991 | Hanna | |
| 5,330,218 A | 7/1994 | Escudero | |
| 5,383,675 A | 1/1995 | Liebert | |
| 5,542,893 A | 8/1996 | Petersen et al. | |
| 5,713,590 A * | 2/1998 | Clark | 280/247 |
| 6,572,129 B1 | 6/2003 | Bean | |
| 7,584,976 B2 | 9/2009 | Bayne et al. | |
| 8,118,320 B2 | 2/2012 | Lee | |
| 2008/0277896 A1 | 11/2008 | Lee et al. | |
| 2011/0298194 A1 * | 12/2011 | Sanchez | 280/245 |

* cited by examiner

*Primary Examiner* — Kevin Hurley
(74) *Attorney, Agent, or Firm* — Dicke, Billig & Czaja, PLLC

(57) ABSTRACT

A human-powered-system utilizing an arm lever assembly and/or a pedal assembly to be adapted to or incorporated into other mechanisms including, but not limited to, wheelchairs and vehicles. The arm lever assembly includes an arm lever that is reciprocated to provide power and rotated left or right to provide steering control. Both assemblies are operatively connected to a converter, utilizing gears and one-way clutches that receives the reciprocal movements of the arm lever and converts them into a unidirectional output, to be utilized in combination or independently. The arm lever is further telescoping and when utilizing a slide mechanism operatively connected to the converter representing a first class lever offers a range of various leverages by correspondingly changing the length of the force and load end when extended and retracted.

13 Claims, 19 Drawing Sheets

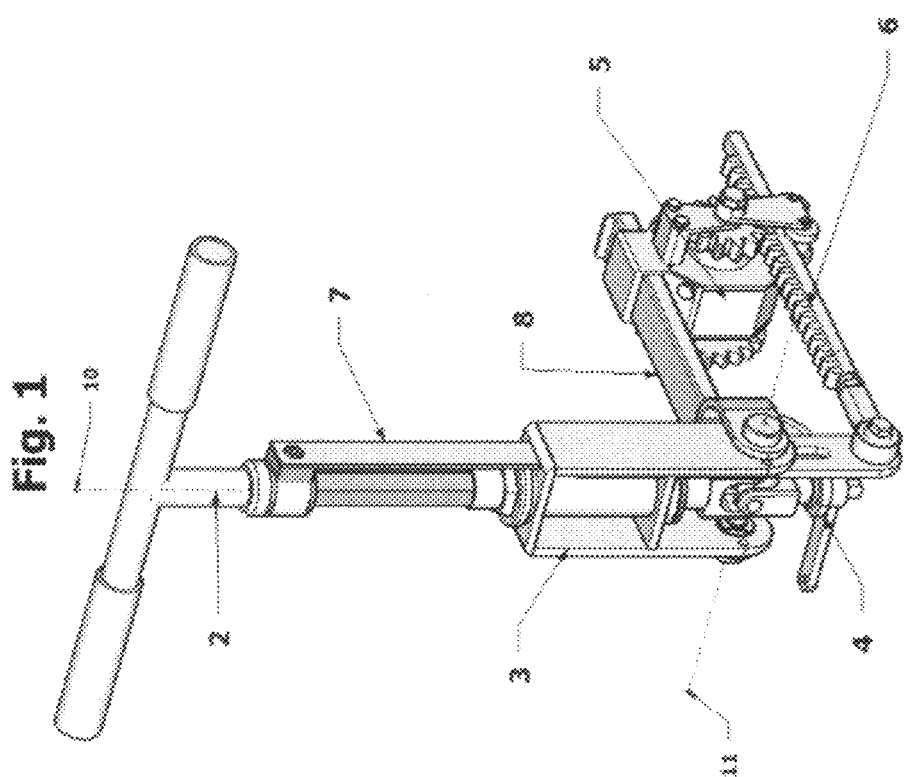

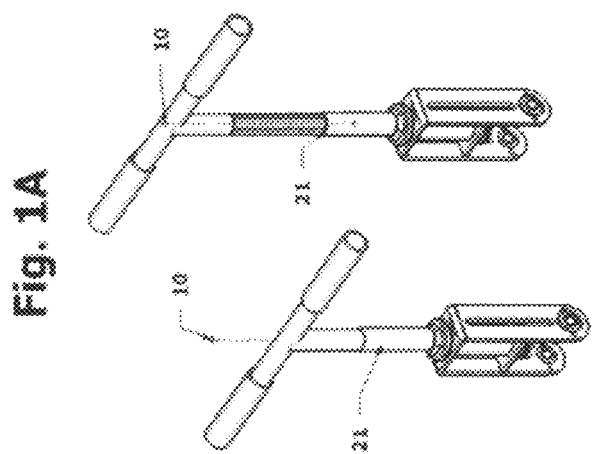
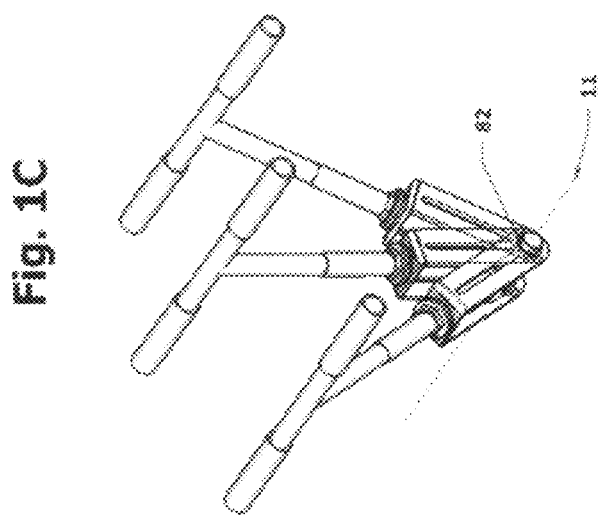
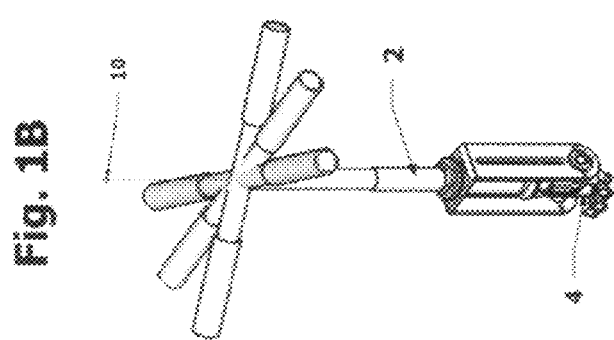

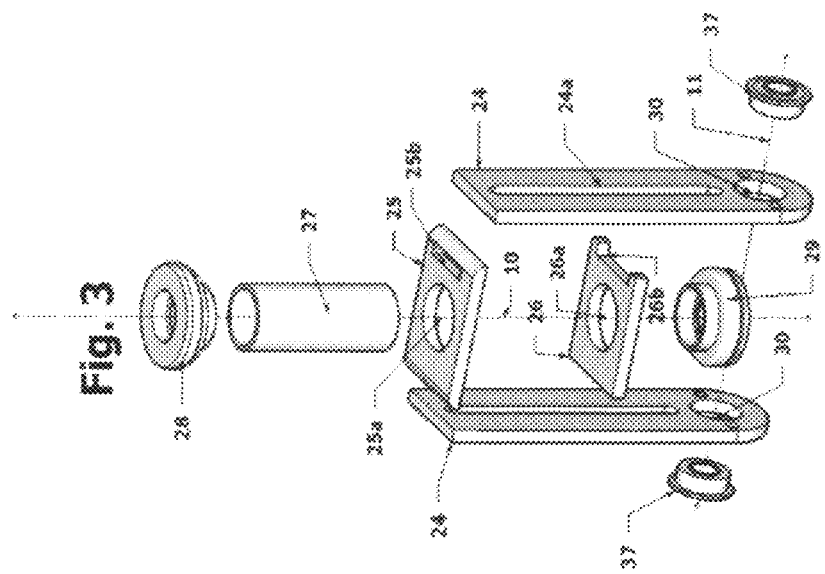
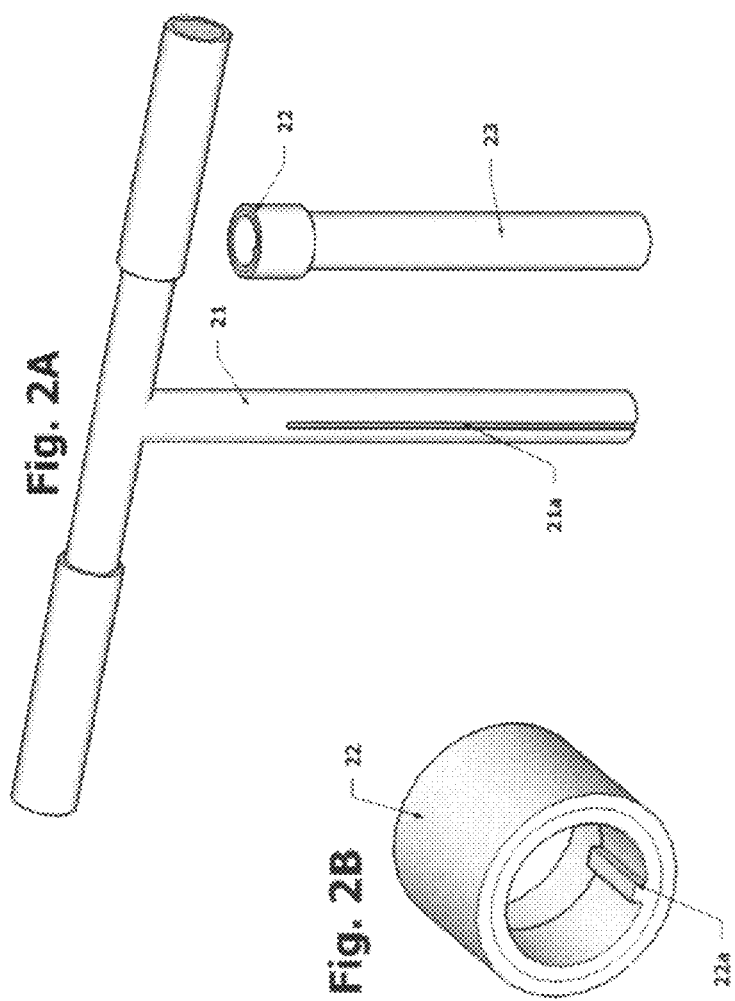

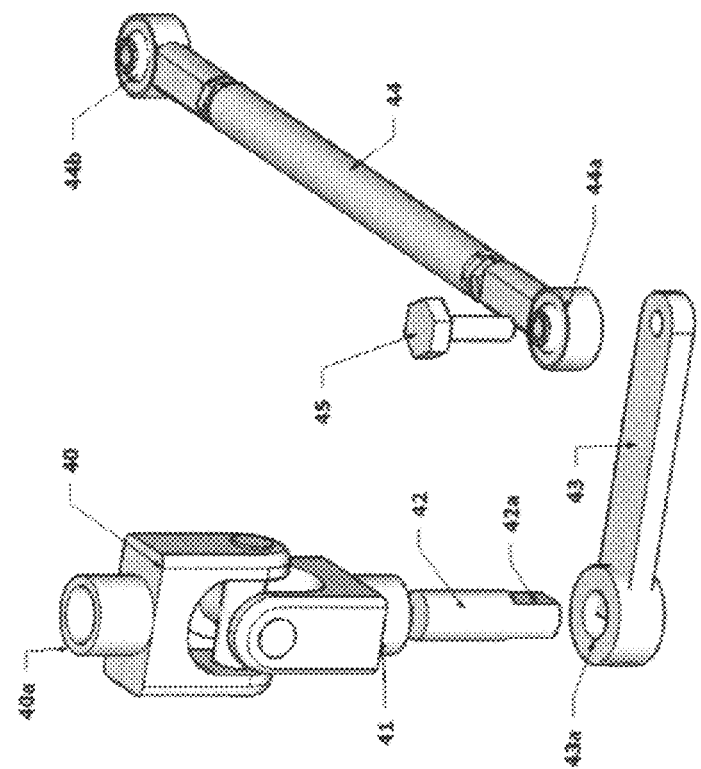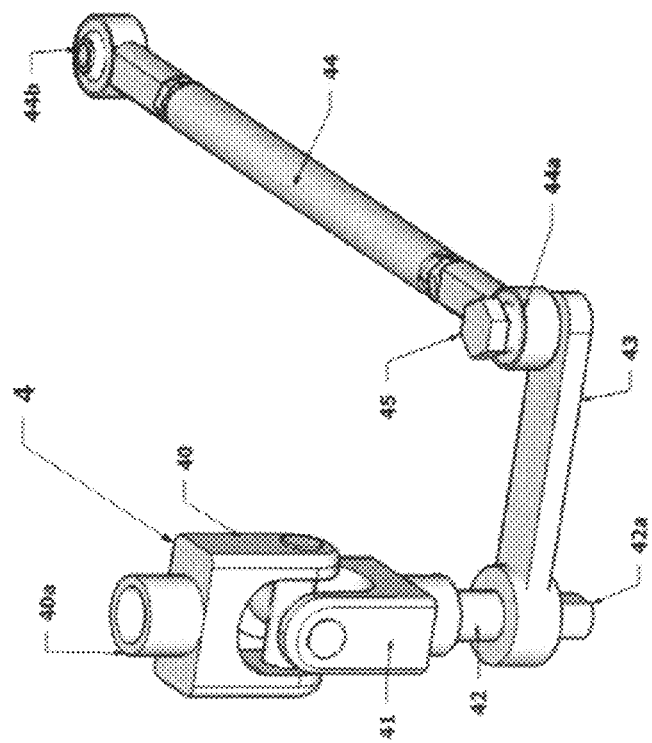

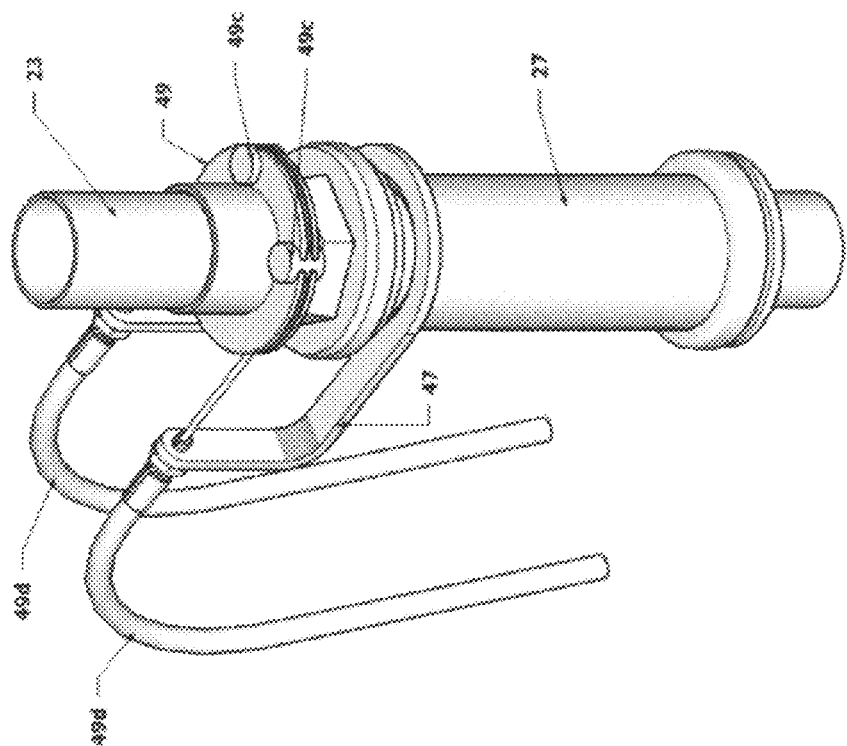
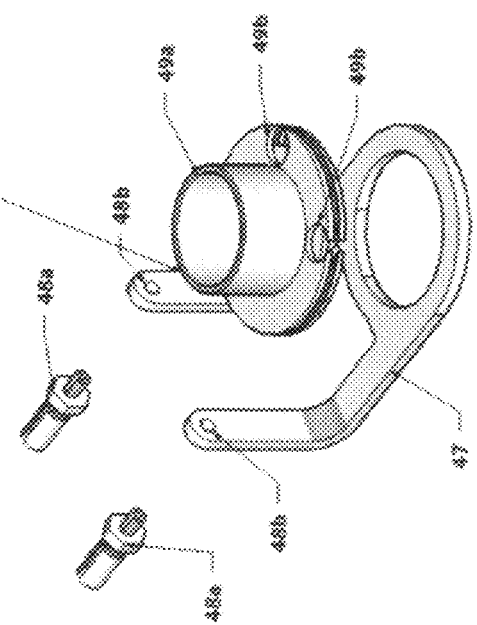

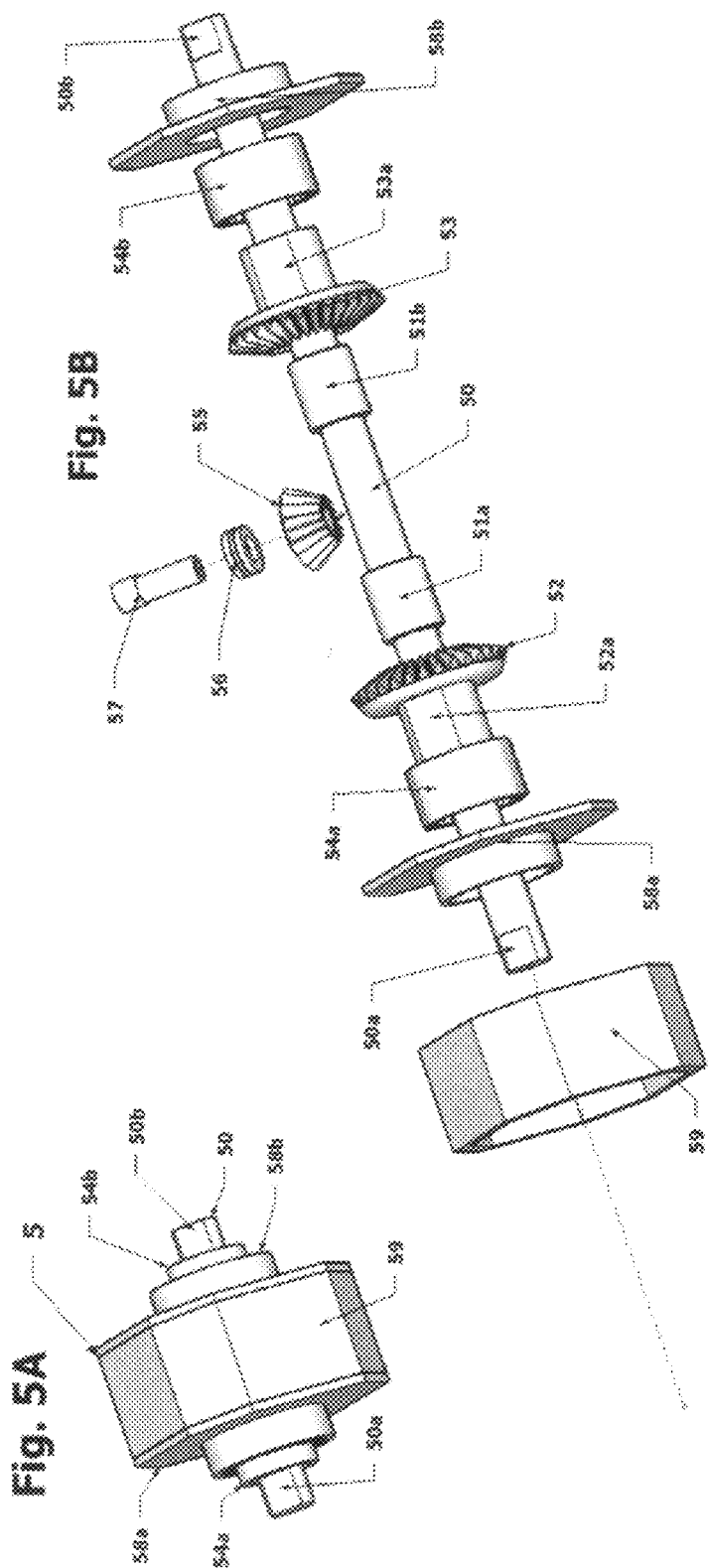

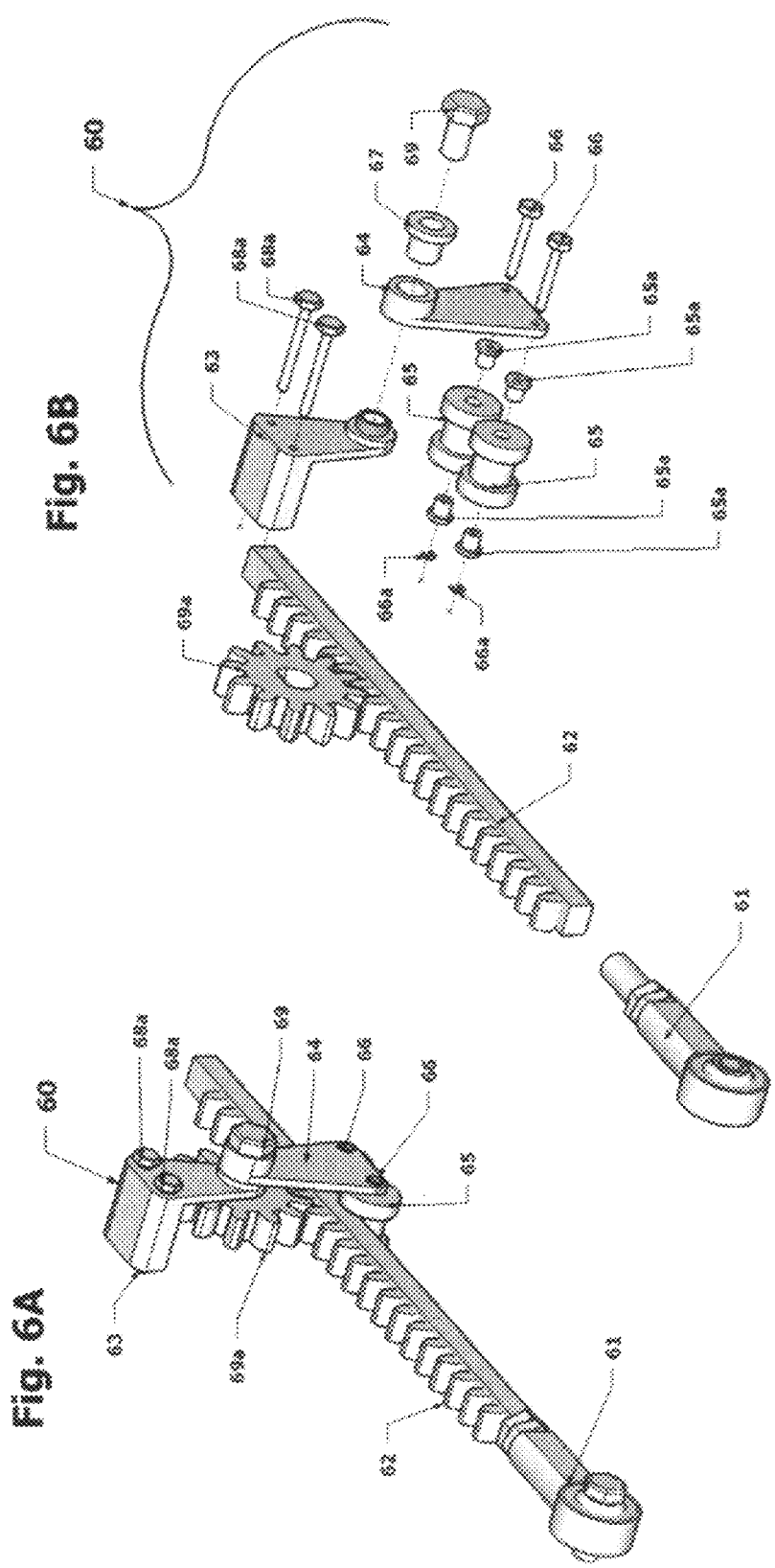

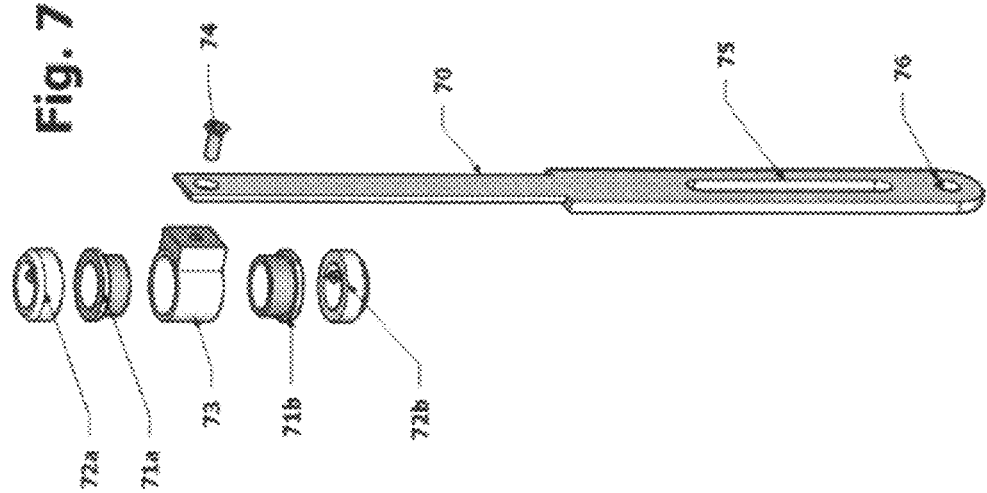
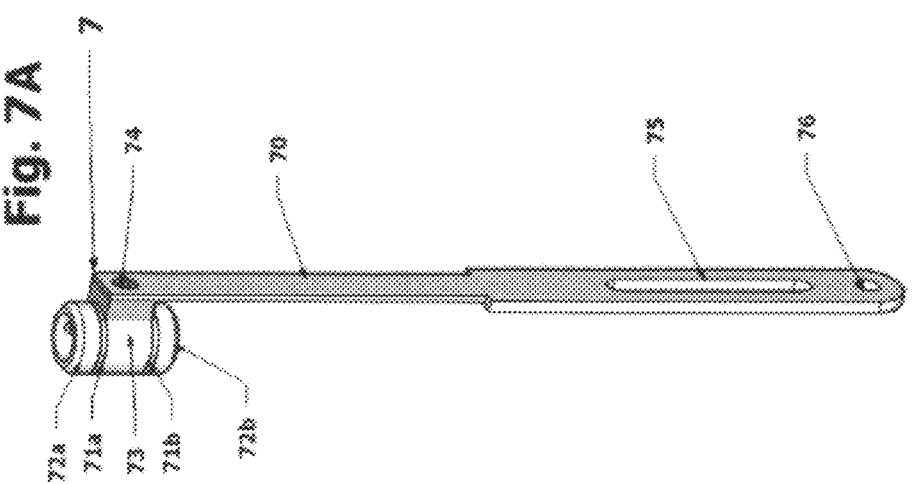

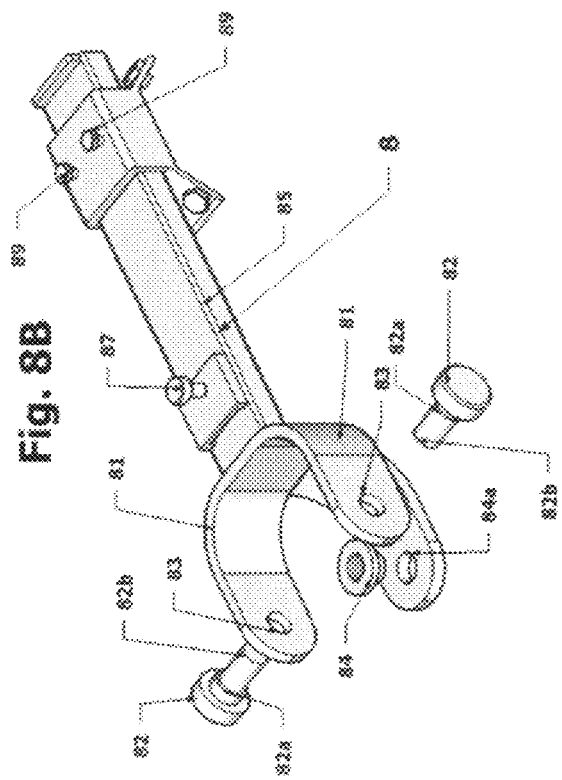

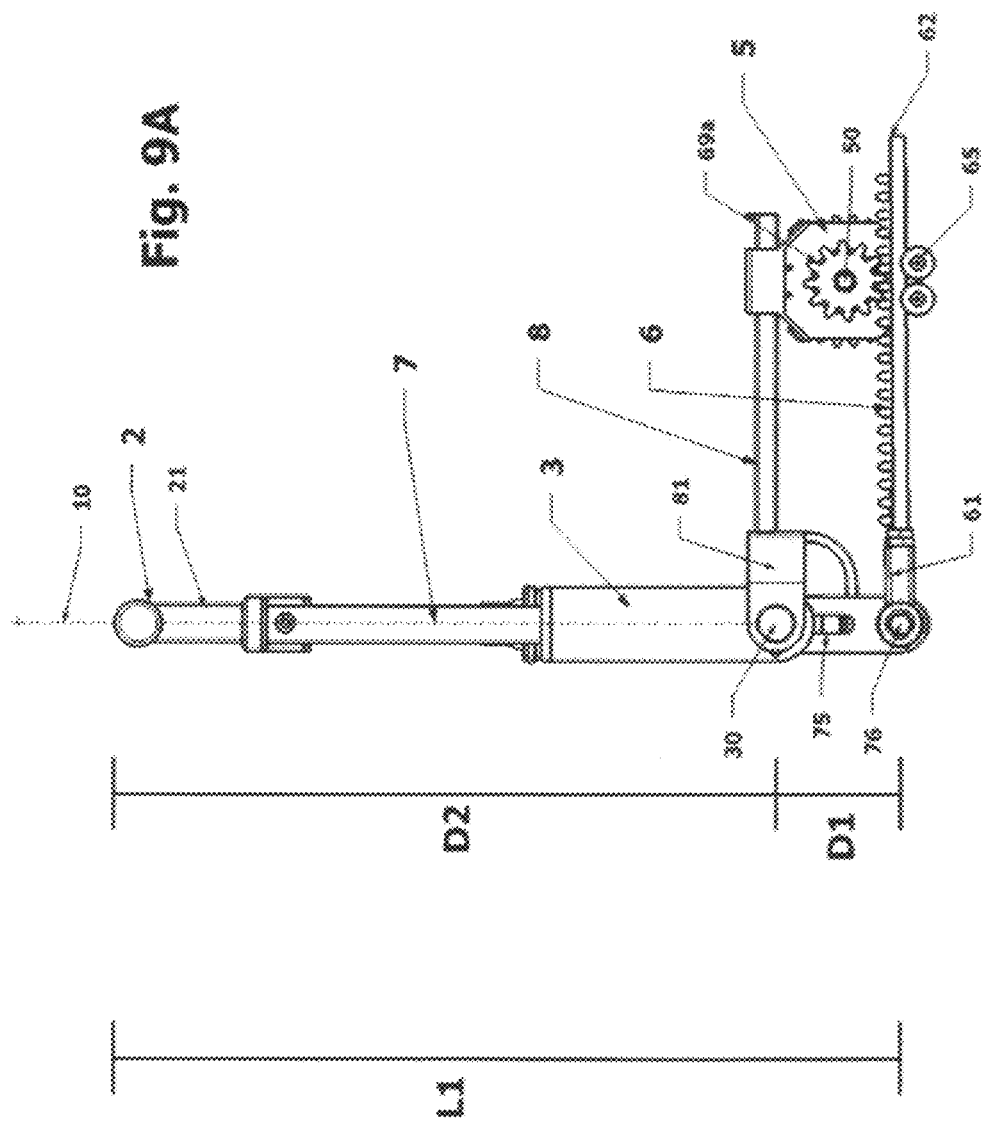

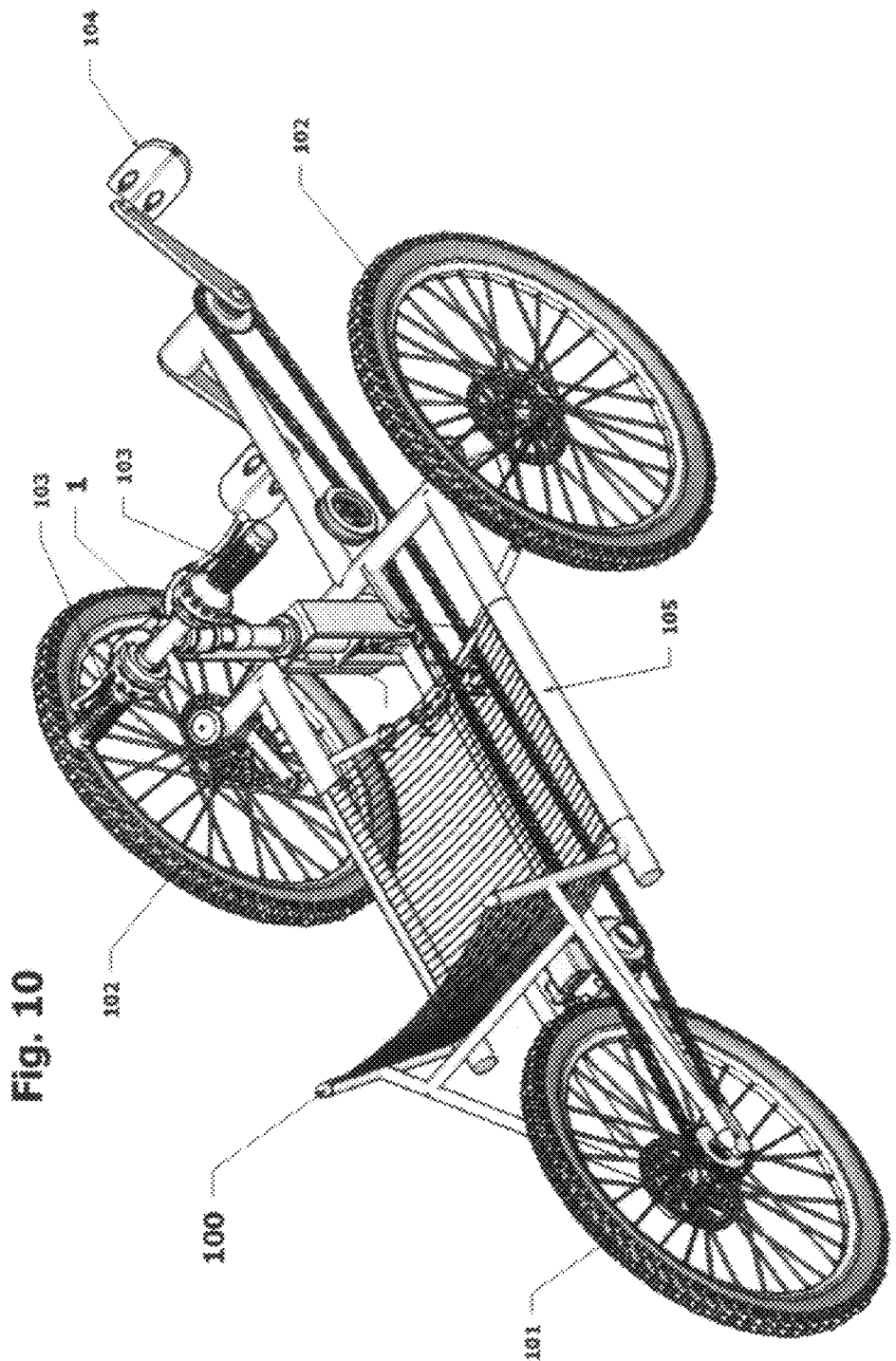

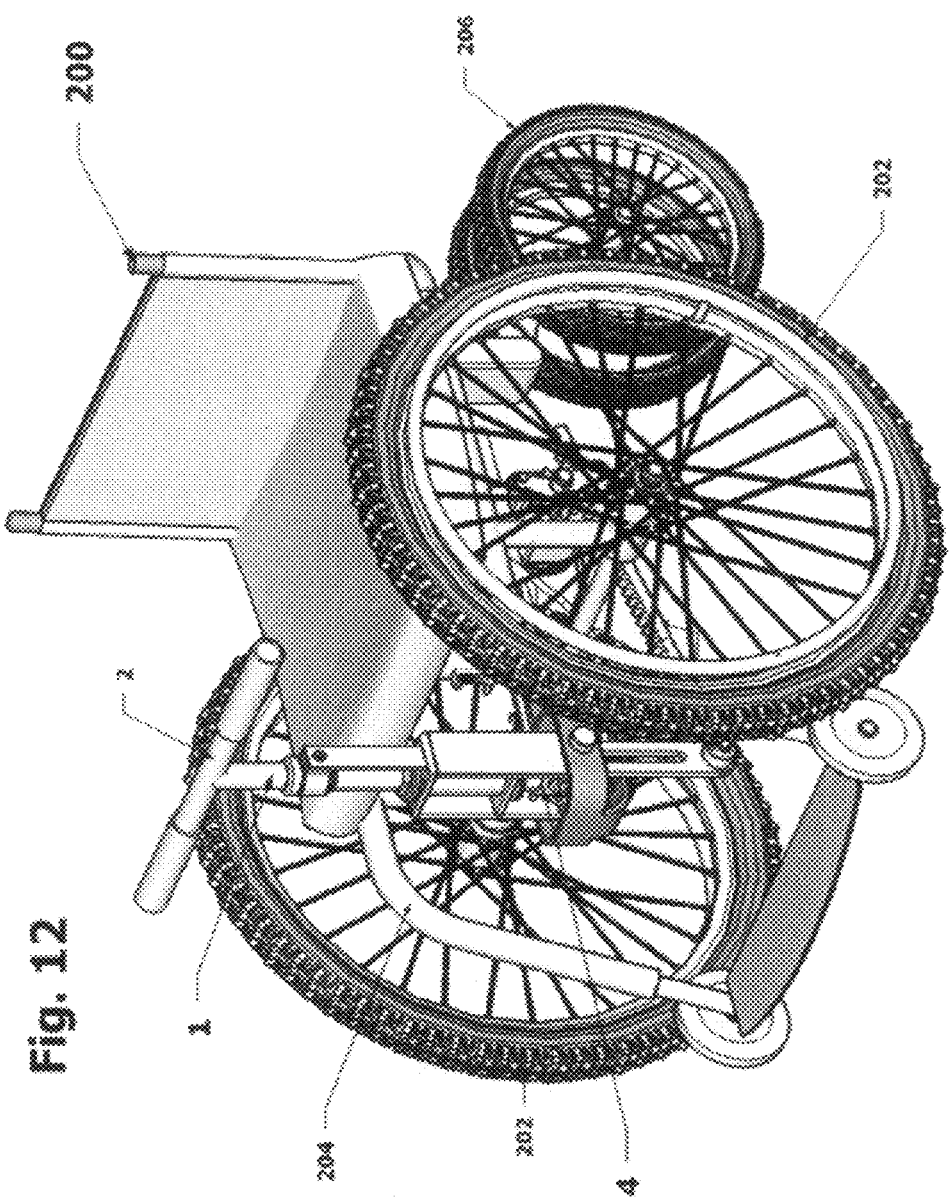

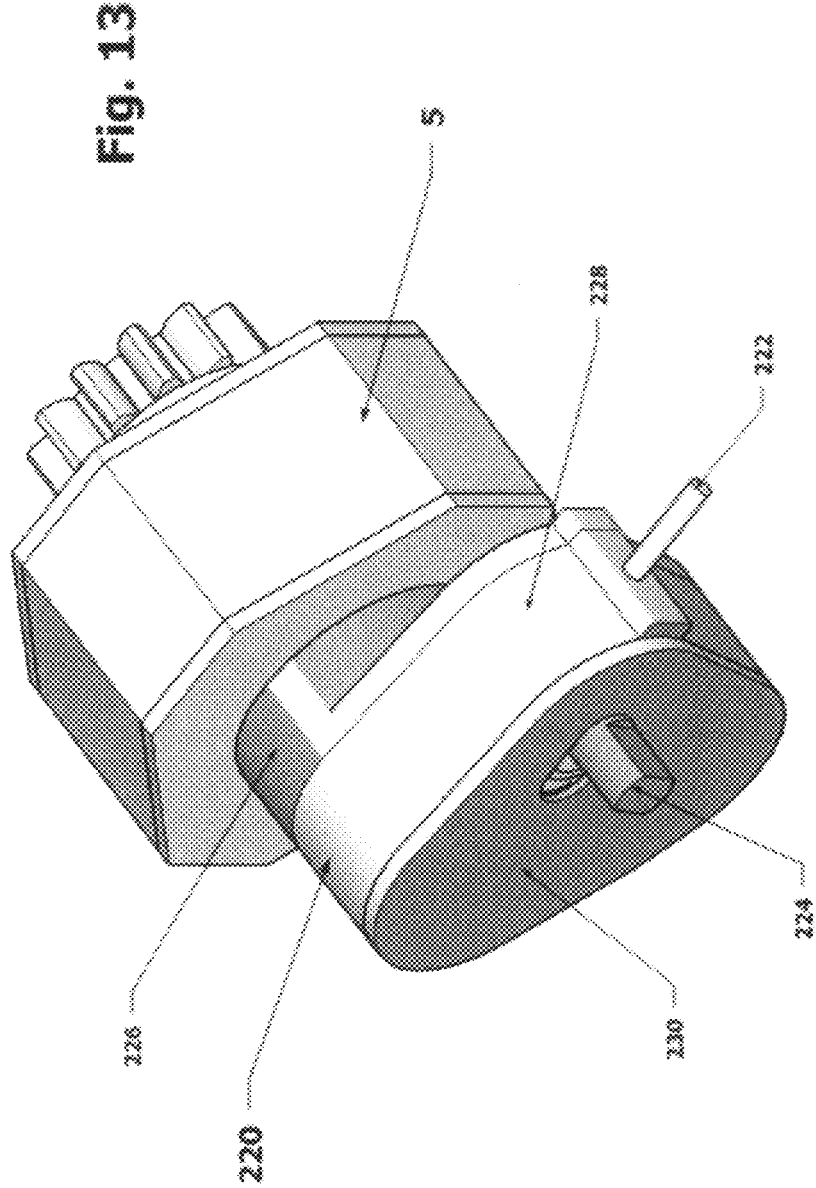

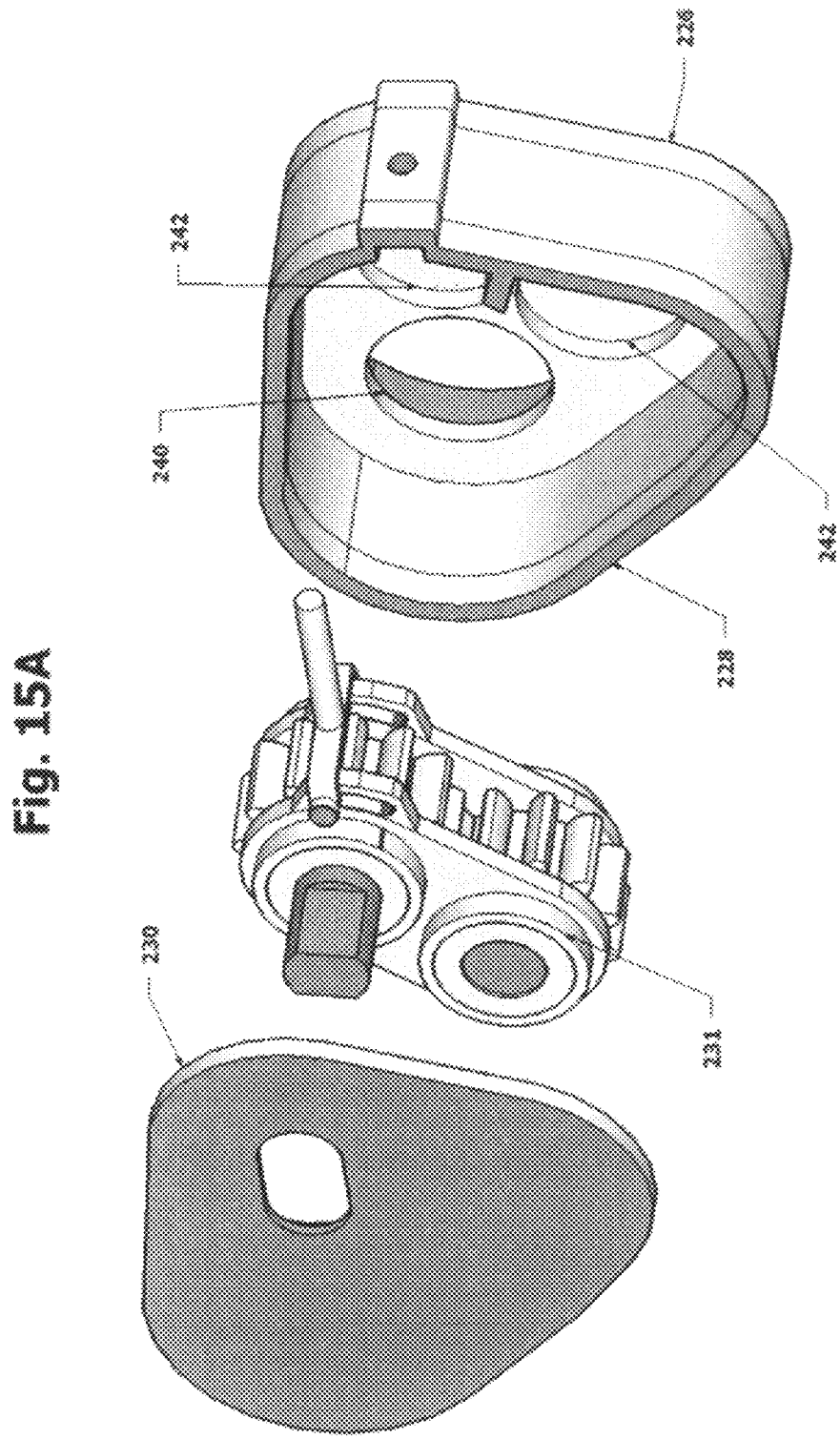

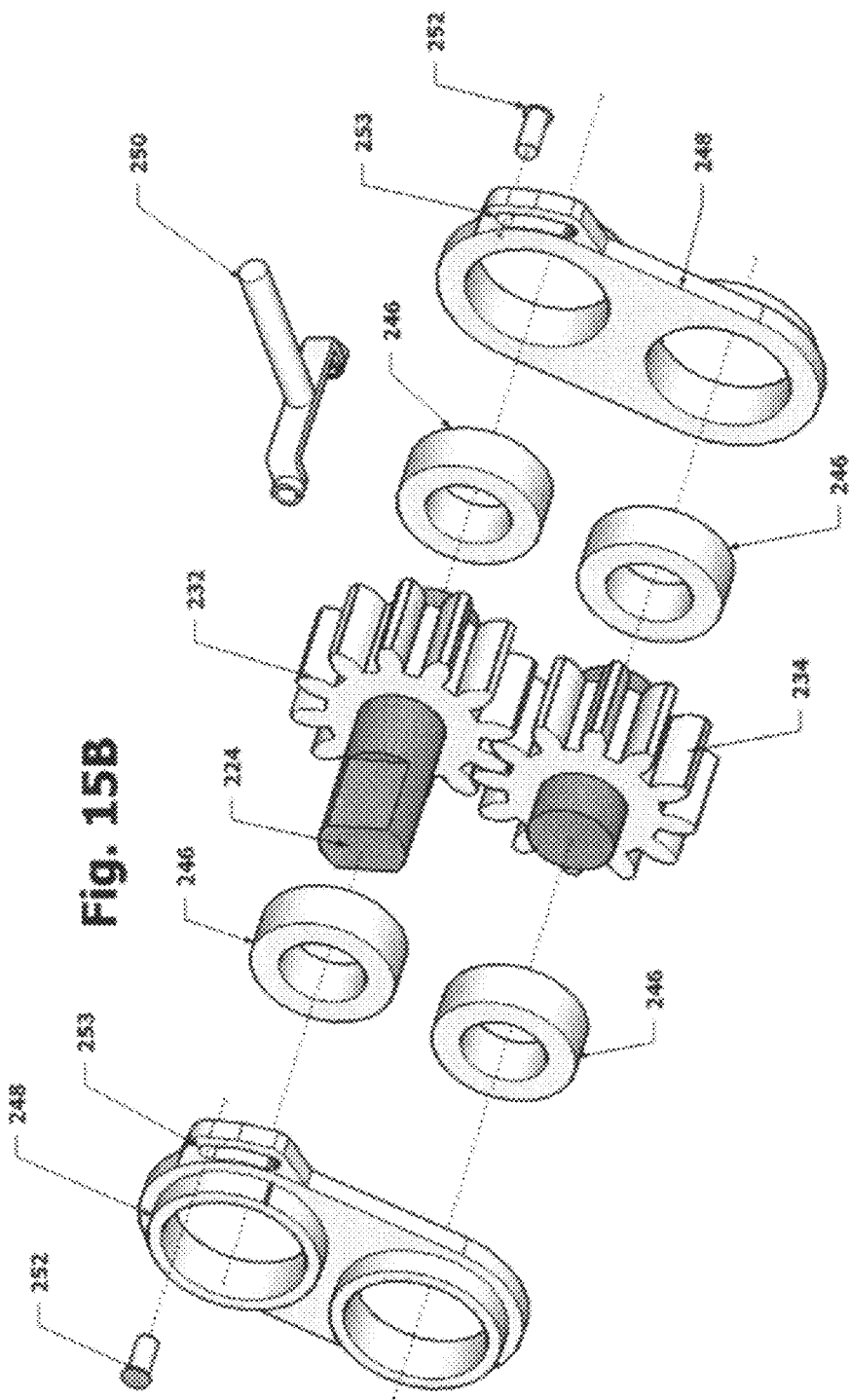

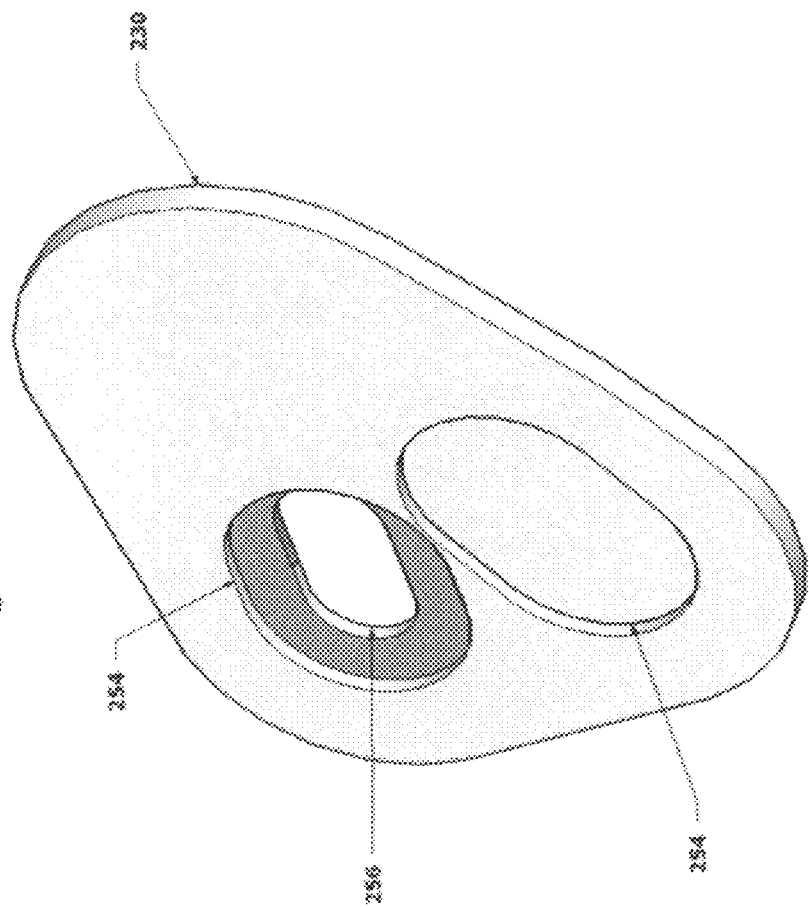

SINGLE LEVER DRIVE SYSTEM

CROSS-REFERENCE TO RELATED APPLICATIONS

This application claims is a continuation-in-part of U.S. patent application Ser. No. 13/861,355 filed on Apr. 11, 2013, and Ser. No. 13/860,619, filed on Apr. 11, 2013, the contents of each aforementioned application are incorporated herein by reference.

BACKGROUND

This disclosure relates to human powered systems that can be operated by arms and or legs of an operator to provide powering and controlling mechanisms including exercise equipment, rehabilitation equipment, wheelchairs, vehicles and the like.

A variety of converter systems have been developed in the past for bicycles, tricycles and hand-cycles in various designs including recumbent style human powered vehicles, etc. While current systems employ a traditional pedal crank drive commonly found on bicycles, there are some systems that employ levers to be reciprocated fore and aft with ratchet systems to propel the vehicle in one direction of the lever movement. Others arm lever systems propel a vehicle forward in both fore and aft reciprocal movements through ratchet mechanisms and one-way clutch and gear systems. Other vehicles are propelled by both hand and foot operation.

Liebert in U.S. Pat. No. 5,383,675 combines hand and foot operation in a versatile system that can be incorporated into different embodiments to allow an operator to propel the system on land, water and air. The system relies on reciprocating movements of both hand and foot that are connected together and helmet to be worn that is linked to a steering mechanism that activates by the movement of the operators head. The arm and leg levers are linked together and do not allow the operator to use one or the other separately without removing his arms or legs from the corresponding levers. Further, the head activated steering does not allow the operator to be able to look around without altering the path of the vehicle.

Bean in U.S. Pat. No. 6,572,129 combines hand and foot operation in a single embodiment that employs a conventional pedal assembly linked to the two arm lever assemblies by a spring loaded length of chain that wraps around a ratcheting freewheel sprocket axially supported by the pedal assembly which only adds power on the reverse stroke of hand levers, which has limited efficiency. Further, although the pedal assembly can be utilized separate of the arm levers to propel the vehicle the same cannot be said for the arm levers which activates the pedal assembly when be utilized to propel the vehicle.

Bayne in U.S. Pat. No. 7,584,976 is a single lever operated trike design that propels a vehicle forward with both fore and aft reciprocal movements of the arm lever. Further, the lever activates the steering through a cable system. The converter system utilizes a plurality of chains and hubs supporting gears. Although unique in design, it lacks in simplicity of design and versatility to be employed into other mechanisms and the ability to incorporate the use of an operator's legs.

SUMMARY

A human-powered-system is disclosed with versatility that can be used by many different individuals, each of whom can have different needs and capabilities and can be incorporated for both utilitarian and recreational purposes. It can be operatively utilized by or incorporated into many different mechanisms including, but not limited to, rehabilitation apparatuses, exercise equipment, wheelchairs and human powered vehicles.

In one embodiment, the human-powered-system comprises of a telescoping, "T" shaped, arm lever assembly that includes an arm lever and reciprocating member. The arm lever assembly can be reciprocated and pivoted counterclockwise and clockwise by an operator. The arm lever assembly is reciprocated for propulsion and is operatively connected to a drive output that receives input force from the arm lever assembly. In one embodiment, the drive output is a converter that receives the reciprocating movements and converts then into a unidirectional rotation of an output wheel to be operatively linked to propel the other mechanisms.

The arm lever assembly is capable of controlling multiple elements by corresponding pivoting clockwise and counterclockwise movements of the arm lever assembly to provide the operator with control of a function of another mechanism such as steering.

The arm lever assembly can be directly connected at a fulcrum point to the converter, wherein the telescoping movements can offer a lesser range of leverages by increasing and decreasing the length of the arm lever. When the arm lever assembly is fitted with a slide mechanism, it is operatively linked to the converter by a rack link that pivotally connects to the slide mechanism below the fulcrum point, providing the operator with a greater range of leverages by correspondingly changing the distance of the load and force end from the fulcrum point in respects to a first class lever. For example, when the arm lever is extended, the force end becomes longer and the load end becomes shorter and, when the arm lever is retracted, the force end becomes shorter and the load end becomes longer.

The arm lever assembly is also pivotally supported to a steering control and the converter. In one example, a support bracket is used and can be mounted to a frame of a vehicle.

Further, an optional foot pedal assembly can be rigidly attached to a front of a support frame and operatively linked to the converter. This embodiment offers the operator the ability to add leg power to the vehicle system.

Additional objects, advantages, and other novel features of the invention will be set forth in the detailed description that follows with reference to the accompanying drawings, and will become apparent to those skilled in the art upon examination of the following, or will be learned with the practice of the invention. The objects and advantages may be realized and obtained by means of the instrumentalities and combinations particularly pointed out in the appending claims.

BRIEF DESCRIPTION OF THE DRAWINGS

FIG. 1 is an isometric view of one embodiment of a single lever drive system.

FIG. 1A is an isometric view of the drive system of FIG. 1 that illustrates telescoping movements.

FIG. 1B is an isometric view of the drive system of FIG. 1 that illustrates rotational movements.

FIG. 1C is an isometric view of the drive system of FIG. 1 that illustrates pivoting movements.

FIG. 2A is an exploded isometric view of an arm lever.

FIG. 2B is an isometric end view of a guide collar used in the arm lever of FIG. 2A.

FIG. 3 is an exploded isometric view of a reciprocating member coupleable with the arm lever of FIG. 2A.

FIG. 4A is an isometric view of a u-joint controller.

FIG. 4B is an exploded isometric view of the u-joint controller of FIG. 4A.

FIG. 4C is an isometric view of a cable controller.

FIG. 4D is an exploded view of the cable controller of FIG. 4C.

FIG. 5A is an isometric view of a converter.

FIG. 5B is an exploded isometric view of the converter of FIG. 5A.

FIG. 6A is an isometric view of a rack link.

FIG. 6B is an exploded isometric view of the rack link of FIG. 6A.

FIG. 7A is an isometric view of a slide mechanism.

FIG. 7B is an exploded isometric view of the slide mechanism of FIG. 7A.

FIG. 8A is an isometric view of a support bracket coupled with the u-joint controller of FIG. 4A and the converter of FIG. 5A.

FIG. 8B is an exploded isometric view of the support bracket of FIG. 8A.

FIGS. 9A and 9B are isometric views of the slide mechanism that illustrates movements with respect to the arm lever assembly.

FIG. 10 is an isometric view of a vehicle that utilizes the drive assembly of FIG. 1 and a pedal crank assembly.

FIG. 12 is an isometric view of a wheelchair that utilizes the drive assembly of FIG. 1.

FIG. 13 is an isometric view of a converter and a reverse gearbox.

FIGS. 15A-15C are isometric views of components in the reverse gear box illustrated in FIG. 13.

DETAILED DESCRIPTION

Figure 9B:
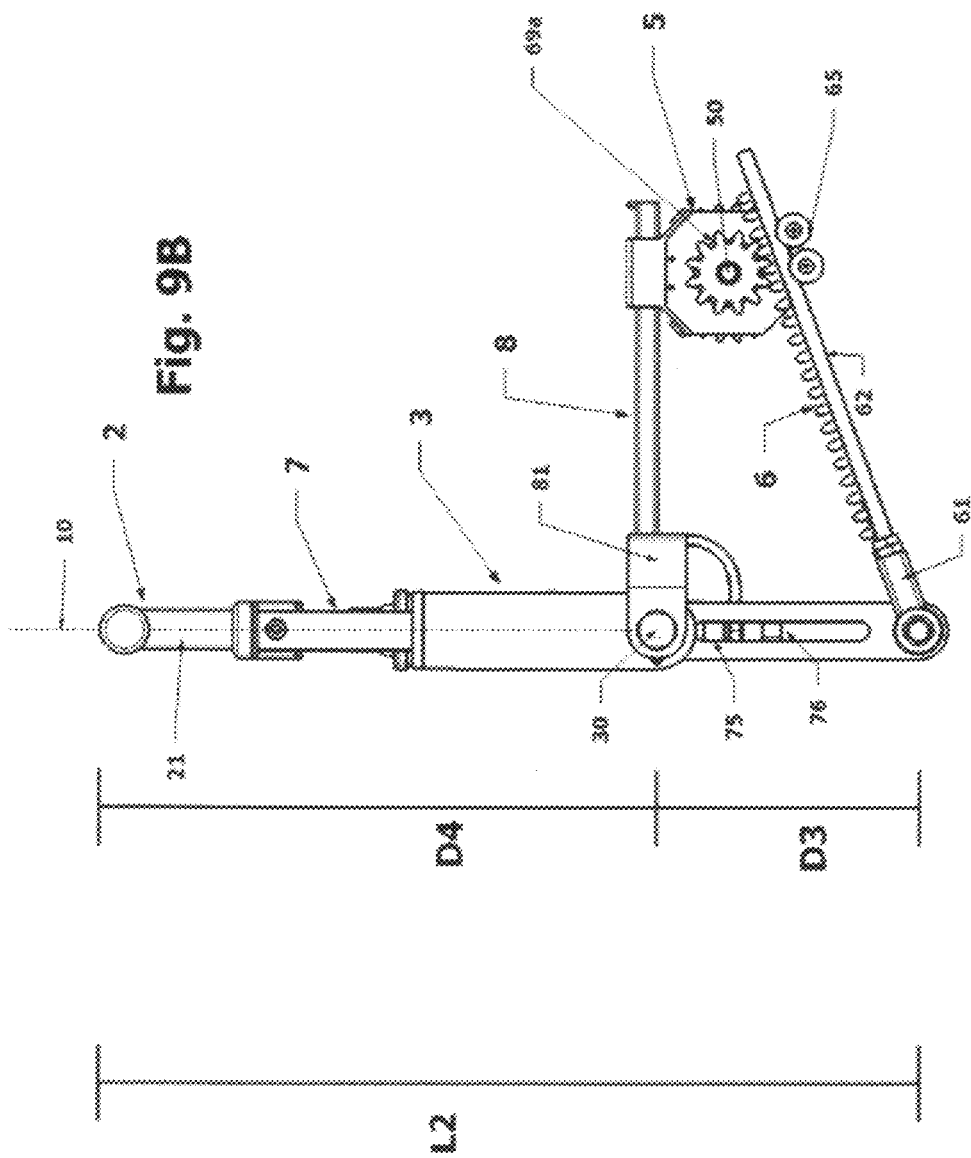

Referring now to FIG. 1, there is illustrated one possible arrangement of a drive assembly 1. Details of various components of the drive assembly 1 are provided below. In general, the drive assembly 1 includes an arm level assembly comprised of an arm lever 2 and a reciprocating member 3, a u-joint controller 4, a drive output embodied as a converter 5, a rack link 6, a sliding mechanism 7 and a support bracket 8. The arm lever 2 is coupled to the reciprocating member 3 in a telescoping manner such that the arm lever 2 can move with respect to reciprocating member 3 along a central axis 10 (see telescoping movements in FIG. 1A). Additionally, the arm lever 2 is coupled with u-joint controller 4 for rotation about central axis 10 of the arm lever 2 (see rotational movements in FIG. 1B) as well as pivoting about a horizontal or pivot axis 11 (see pivoting movements in FIG. 1C).

The arm lever 2 is further coupled to slide mechanism 7 to move rack link 6 with respect to converter 5. In particular, pivoting movement of arm lever 2 about pivot axis 11 drives converter 5 through slide mechanism 7 and rack link 6. Rack link 6 couples the converter 5 to the slide mechanism 7 such that fore and aft movements of arm lever 2 are transferred through the rack link 6 to the converter 5. Support bracket 8 is fixed to both the reciprocating member 3 and the converter 5. In sliding the arm lever 2 with respect to the reciprocating member 3, mechanical advantage of the drive assembly 1 can be altered, for example by changing leverage in a first class lever. For example, a length of slide mechanism 7 above pivot axis 11 can be lengthened or shortened by moving the arm lever 2 along axis 10 so as to alter forces applied to the converter 5 by rack link 6. In this configuration, a connection point of arm lever 2 to the u-joint controller 4 for steering control is spaced apart in both longitudinal and lateral directions with respect to a connection point between rack link 6 and slide mechanism 7.

Referring now to FIG. 2A, arm lever 2 is telescoping and includes an upper section 21, a guide collar 22 and a lower section 23. An end view of guide collar 22 is shown in FIG. 2B. The upper section 21 is "T" shaped and graspable by the operator and defines a slot 21a along an outer diameter to cooperate with the guide collar 22. The lower section 23 is slightly larger in diameter than upper section 21 and slip fits around the outer diameter of the upper section 21. In particular, the guide collar 22 is fixed to the top of the lower section 23 and has a protrusion 22a (FIG. 2B) that cooperates with the slot 21a, allowing the two sections 21, 23 to be telescopically free while maintaining rotational unity.

As illustrated in FIG. 3, the reciprocating member 3 includes two vertical plates 24 fixed with a top plate 25 and a cross member 26. Each of the top plate 25 and cross member 26 include corresponding apertures (25a and 26a, respectively) through their centers, to rigidly support a rotary tube 27 near both ends. Rotary tube 27 is fitted with a bearing 28 at a top end and a bearing 29 at a bottom end. The bearing 29 is coupled with the lower section 23 of the arm lever 2 to allow rotational movements of the arm lever 2 about central axis 10.

Each of the vertical plates 24 defines fulcrum points 30 at a lower portion of the plates 24. The fulcrum points 30 are each fitted with pivot bearings 37 to allow the arm lever 2 to pivot about horizontal axis 11. Top plate 25 and the cross member 26 each have a slot 25b and 26b, respectively, to receive the slide mechanism 7, discussed below.

Referring now to FIGS. 4A and 4B, the u-joint controller 4 includes an upper half 40 pivotally coupled with a lower half 41. The upper half 40 of the u-joint controller 4 includes an end 40a that is fixed to the lower section 23 of the arm lever 2. The lower half 41 of the universal joint is fitted with a stub shaft 42 defining a square cut end 42a. A pitman arm 43, having a square bore 43a, is coupled to square cut end 42a of the stub shaft 42. Tie rod 44 includes opposed pivot joints 44a, 44b at each end. Pivot joint 44a is attached to the pitman arm 43 by a fastener 45. Pivot joint 44b, in one embodiment, is coupled to an axis for rotation of a wheel coupled thereto.

FIGS. 4C and 4D illustrate an alternative controller to U-joint controller 4. In particular, the alternative controller comprises a cable controller 46 coupled with lower section 23 and rotary tube 27 as illustrated. A cable support 47 is assembled to an outer diameter of the rotary tube 27 and cable tension adjusters 48a are positioned in holes 48b on the cable support 47. A rotary member 49a includes notches 49b that receive cable barrel ends 49c that are coupled with corresponding cables 49d. Rotation of the lower section 23 is transferred to the cables 49d in order to control a remove device, for example a wheel coupled to a remote end of cables 49d.

Referring now to FIGS. 5A and 5B, there is illustrated two views wherein FIG. 5A shows the converter 5 fully assembled and FIG. 5B shows an exploded view (common shaft 50 is shown lengthened) for further explanation of components of the converter 5. The converter 5 includes the common shaft 50 (that includes ends 50a and 50b) and opposed one-way clutches (i.e., ratchet mechanisms) 51a and 51b that translate rotational power from one end (e.g., end 50a) to another end (e.g., end 50b) of the common shaft 50.

Positioned next to each of the one-way clutches 51a and 51b are two outer gears 52 and 53. Each of the outer gears 52 and 53 has an extended hub 52a and 53a with a "D" cut, wherein an outer diameter of each hub axially supports at least one bearing 54a and 54b capable of both radial and thrust loads. Further, each of the outer gears 52 and 53 have a bored center that is operatively fitted with at least one one-way clutch 51a and 51b coaxially supported by the common shaft 50. An idler gear 55 that is backed by a thrust bearing 56 and axially supported by a stub shaft 57 is further arranged orthogonally to and intermeshed between outer gears 52 and 53. The stub shaft 57 is fixed to the inside of a middle housing section 59 and opposed housing end caps 58a and 58b axially support an outer diameter of opposed bearings 54a and 54b.

In one embodiment, one of the one-way clutches (e.g., clutch 51a) is operatively fitted such that each of the outer gears 52 and 53 engage in opposite rotations of the common shaft 50 and at least one of the extended hubs (e.g., hub 53a) of the outer gears (e.g., gear 53) is utilized as an output end. In this arrangement, the common shaft 50 receives reciprocating movements from rack link 6, wherein forward rotational direction of the common shaft 50 engages one of the outer gears (e.g., gear 52) and the reverse rotation of the common shaft 50 engages the opposite of the outer gears (e.g., gear 53) due to connection of the idler gear 55 with gears 52 and 53 to maintain an opposite unidirectional rotation.

The common shaft 50 can alternatively be utilized as an output where both one-way clutches 51a and 51b are operatively fitted by each of the outer gears 52 and 53 to engage the shaft 50 in the same rotational direction. In this arrangement, at least one of the outer gears 52 and 53 receives reciprocating movements. Since gears 52 and 53 are intermeshed by the idler gear 55, each gear 52 and 53 takes turns engaging the common shaft 50 in unidirectional rotation. In alternative embodiments, converter 5 can be replaced with other alternative drive output mechanisms as desired that receive force from the arm lever 2 and transfer the force to another mechanism.

Referring now to FIGS. 6A and 6B, the rack link 6 is illustrated and includes a guide assembly 60 and a pivot joint 61 fastened at one end of a rack gear 62 that is operatively connected to the arm lever 2. A cog wheel 69a is axially fixed to the common shaft 50 of the converter 5 and the guide assembly 60 maintains proper contact with rack gear 62 and the cog wheel 69a during reciprocation of the rack gear 62.

In particular, the guide 60 includes an upper guide support 63 fastened to the converter 5 by fasteners 68a, a lower guide support 64 fitted with a bearing 67 and a pin 69 that is fixed to upper guide support 63 to axially support the bearing 67.

Two guides 65 are fitted with bearings 65a in each end and are rotationally supported on pins 66 that are retained in the upper guide support 63 by pin clips 66a. Upon assembly of rack link 6 with converter 5, pin 69 is coaxial with shaft 50.

Referring now to FIGS. 7A and 7B, there is illustrated two drawings one of the slide mechanism 7 assembled (FIG. 7A) and one exploded view (FIG. 7B). The slide mechanism 7 includes a slide 70 that is fixed to a rotary collar 73 by a fastener 74. Rotary collar 73 is fitted with bearings 71a and 71b at opposed ends and supported on an outer diameter of upper section 21 of the arm lever 2. Two lock collars 72a and 72b are supported and fastened on the outer diameter of arm lever 2 at the ends of the bearings 71a and 71b to restrict linear movement of the rotary collar 73. Slide 70 includes an elongated slot 75 and a bore 76. The elongated slot 75 is coupled with the support bracket 8 and provides a limit of range for increasing and decreasing a distance between the fulcrum point 30 and the bore 76, thus altering mechanical advantage of the arm lever 2.

Referring now to FIGS. 8A and 8B, there is illustrated two views of the support bracket 8, one view (FIG. 8A) of the support bracket 8 supporting the converter 5 at one end and the reciprocating member 3 and u-joint controller 4 at an opposite end. The second view (FIG. 8B) is an exploded view of the support bracket 8, which includes a pivot support 81 that pivotally supports the reciprocating member 3 by pivot pins 82 that have two sections wherein a first section is the treaded section 82a that threads into threaded holes 83, and a second section 82b supports the bearings 37 and is positioned within the bearings 37 at fulcrum points 30 of vertical plates 24. A lower bearing 84 is fitted into a corresponding bore 84a in the pivot support 81 and pivotally supports the stub shaft 42 of the u-joint controller 4. A support post 85 is attached to the pivot support 81 and supports a slide bracket 86 retained in position by one or more set screws 89.

Referring now to FIGS. 9A and 9B, there is illustrated corresponding movements of the slide mechanism 7 with the upper section 21 of the arm lever 2. FIG. 9A illustrates when the upper section 21 is in an extended position relative to the reciprocating member 3 and the slide mechanism 7 defines a distance D1 (i.e., the load end) between the fulcrum point 30 and the bore 76. A distance D2 (i.e., the force end) above fulcrum point 30 to a top of upper section 21 together with distance D1 defines a lever distance L1. FIG. 9B illustrates when the upper section 21 is in a retracted position relative to the reciprocating member 3 and the slide mechanism 7 defines a distance D3 greater than distance D1 between the fulcrum point 30 and the bore 76. A distance D4 above fulcrum point 30 to a top of upper section 21 together with distance D3 defines a lever distance L2 equal to L1 in FIG. 9A. As a result, mechanical advantage of the arm lever 2 with respect to the converter 5 is altered from the position of arm lever 2 illustrated in FIG. 9A to the position of arm lever 2 in FIG. 9B. As such, an operator, during operation of the arm lever 2, can easily alter the mechanical advantage of the arm lever 2 in a continuous manner by simply sliding the assembly up and down along axis 10.

Referring now to FIG. 10, there is illustrated a vehicle 100 that incorporates the drive assembly 1. Vehicle 100, in one embodiment, includes a drive wheel 101 and front wheels 102 fitted with disc brakes activated by a corresponding hand brake lever 103. The drive assembly 1 is operably coupled to drive wheel 101. Optionally, a pedal crank assembly 104 is coupled to drive wheel 101. A frame 105 supports the drive assembly 1, the wheels 101, 102, the pedal crank assembly 104 and coupling mechanisms therebetween.

Figure 11:
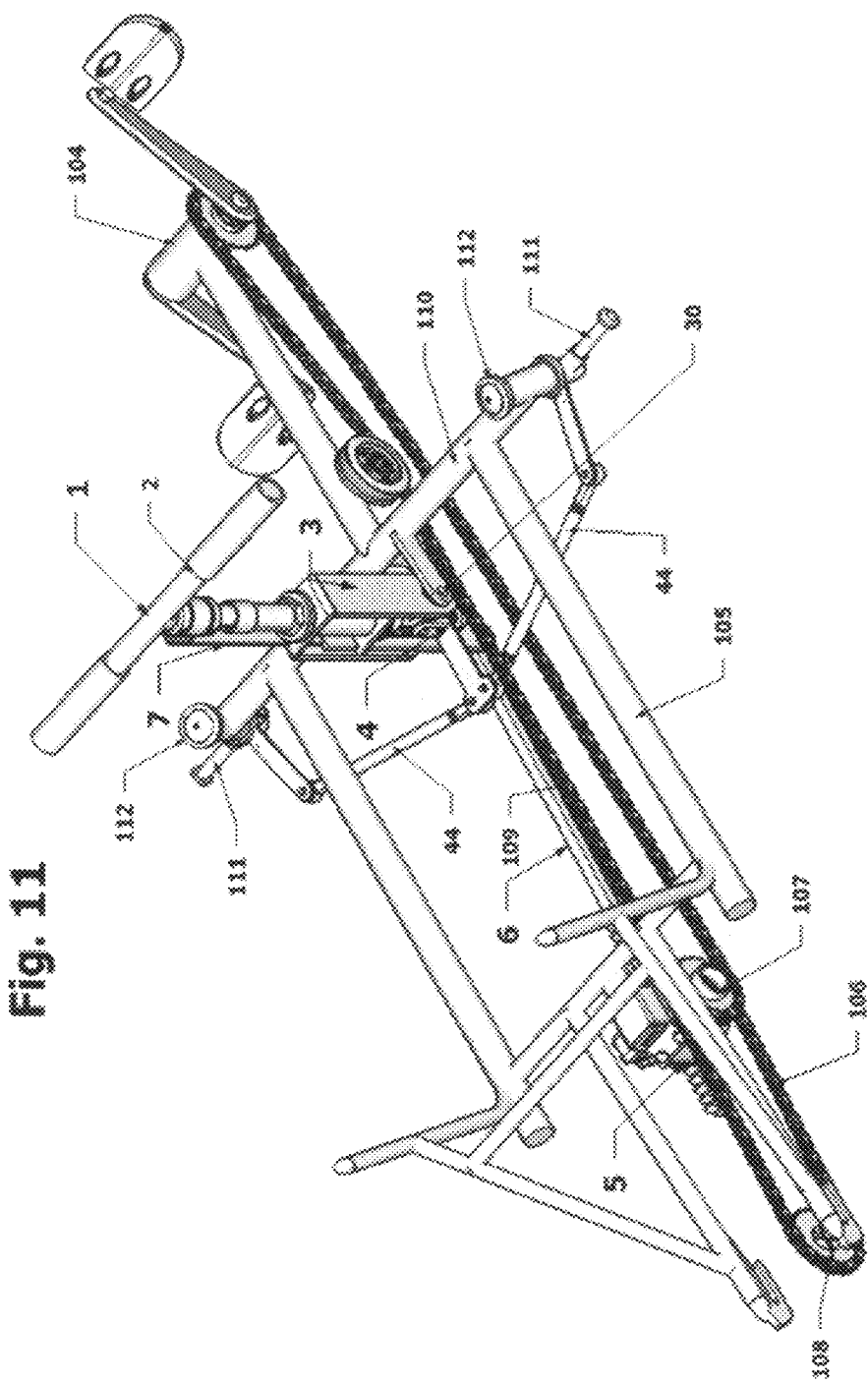
FIG. 11 is an isometric view of a frame supporting a pedal crank assembly of the vehicle in FIG. 10.

FIG. 11 illustrates the frame 105. The arm lever 2 is fitted with the slide mechanism 7 and the u-joint controller 4. The converter 5 is linked to the arm lever 2 by the rack link 6. A chain 106 operatively connects a drive gear 107 to a drive gear 108 coupled with drive wheel 101. Pedal crank assembly 104 is linked to the output of the converter 5 through a chain 109 and fixed to a cross member 110 of frame 105.

The frame 105 pivotally supports the arm lever 2 at the fulcrum point 30 and also pivotally supports the stub shaft 42 (hidden from view) of the u-joint controller 4. Each front wheel 102 is rotationally supported by an axle 111 that is fixed to an inclined kingpin 112 fixed with a steering arm 114 that is pivotally connected to the u-joint controller 4 through tie rods 44. The kingpin 112 is pivotally supported by the frame 105. The pedal crank set assembly 104 is fixed to the front of the cross member 110.

Drive assembly 1 can be coupled to other vehicles, outputs and the like as desired. One example vehicle is a wheelchair 200, illustrated in FIG. 12. The wheelchair 200 includes front drive wheels 202 positioned on either side of a frame 204. Similar to the arrangement for vehicle 100, drive assembly 1 is coupled to drive wheels 202 to translate fore and aft movements of arm lever 2 into movement of the drive wheels 202. Drive assembly 1 is further coupled to a pair of steering wheels 206 through U-joint controller 4 to control steering of the vehicle 200.

In further embodiments, converter 5 can be coupled with a suitable reverse gearbox such as reverse gearbox 220 illustrated in FIG. 13. The reverse gearbox 220 can change a direction for the output of the converter 5. In particular, a shift fork 222 can be positioned to change a direction of rotation for output shaft 224. The reverse gearbox 220 includes a housing formed of a first housing portion 226, a second housing portion 228 and a third housing portion 230.

Figure 14A:
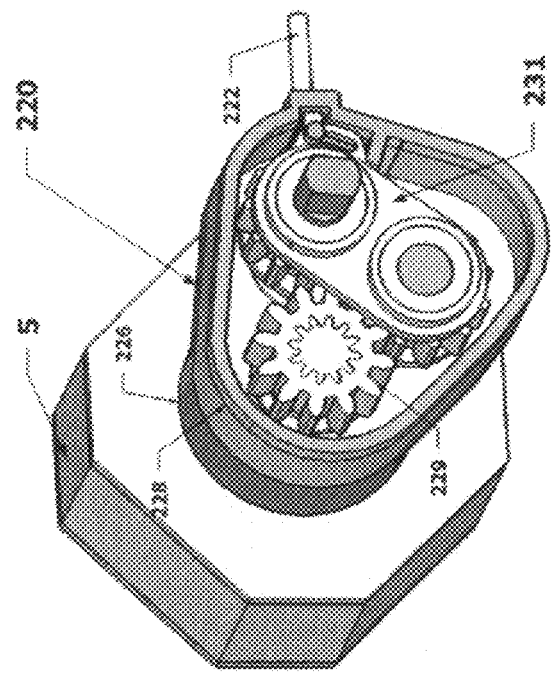
FIGS. 14A and 14B are isometric views of the reverse gear box illustrated in FIG. 13 in first and second positions, respectively.
Figure 14B:
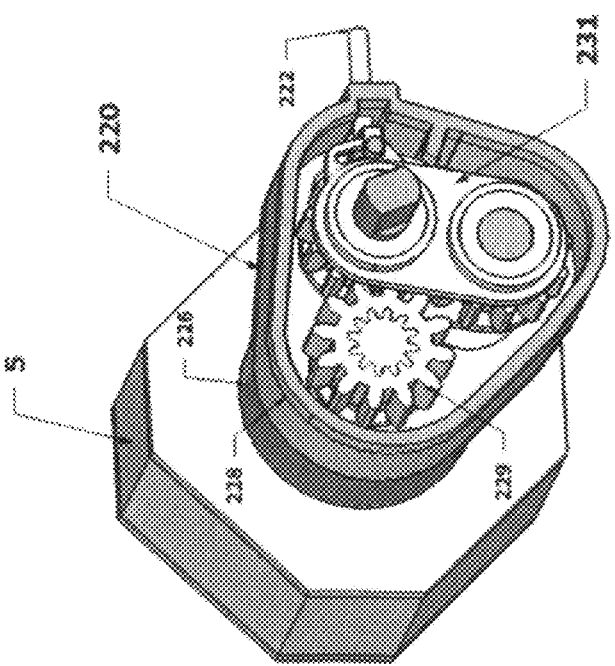

FIGS. 14A and 14B illustrate reverse gearbox 220 in a first and second position, respectively. As illustrated, the gearbox 220 includes an input gear 229 (which is coupled to the output of the converter 5) coupled with a gear assembly 231 including an output gear 232 and a reverse gear 234. In the first position shown in FIG. 14A, input gear 229 is directly coupled to output gear 232 such that input gear 229 and output gear 232 rotate in opposite directions, providing a direction of rotation for output shaft 224. In the first position of FIG. 14A, the shift fork 222 is in a retracted position relative to the housing portion 228. Conversely, in the second position of FIG. 14B, input gear 229 directly engages the reverse gear 234. The reverse gear 234 then operates to rotate output gear 232 in the same direction as input gear 229. Consequently, output shaft 224 operates in an opposite direction to that when the gearbox 220 is in the position illustrated in FIG. 14A. In FIG. 14B, shift fork 222 is in an extended position with respect to housing portion 228, shifting reverse gear 234 into engagement with input gear 229.

FIG. 15A illustrates an exploded view of the reverse gearbox 220, including the first housing portion 226, second housing portion 228 and third housing portion 230. Housing portion 226 includes an aperture 240 to receive a shaft connected to the input gear 229 as well as bearing slots 242 to accommodate gear assembly 231.

With further reference to FIG. 15B, gear assembly 231 is illustrated including the output gear 232, reverse gear 234 and output shaft 224. Positioned on either side of the gears 232 and 234 are a set of bearings 246 that allow rotation of the gears 232 and 234. A pair of bearing retainers 248 accommodate the bearings 246. Shift fork 250 is coupled to bearing retainers 248 through a pair of pins 252 and positioned within elongated slots 253 in the retainers 248.

As illustrated in FIG. 15C, housing portion 230 includes a plurality of bearing slots 254 to accommodate the bearing retainers 248. Additionally, a slot 256 is provided to accommodate output shaft 224 in both the first and second positions of the gearbox 220.

Although the present invention has been described with reference to preferred embodiments, workers skilled in the art will recognize that changes can be made in form and detail without departing from the spirit and scope of the present invention.

What is claimed is:

1. A human-powered-system operated by at least one arm of an operator to be reciprocated fore and aft to produce a drive output, comprising:
    an arm lever capable of reciprocation and rotation utilized by said operator;
    a reciprocating member having a fulcrum point and rotationally supporting said arm lever near an opposite end of said operator;
    a controller operatively connecting the rotational movements of said arm lever to a controlled output at a first connection point;
    a drive output having an input end and an output end, wherein said input end receives reciprocating movements of said arm lever;
    a slide mechanism connected to the arm lever and coupled to the reciprocating member to allow the arm lever to slide relative to the reciprocating member; and
    a rack link coupled to the slide mechanism at a second connection point spaced apart from the first connection point and to the input end of the drive output, the rack link pivotable about the input end of the drive output as a function of a position of the slide mechanism and configured to translate reciprocating movement of the arm lever to the drive output about the fulcrum point.

2. A human-powered system as defined in claim 1 wherein the drive output comprises a converter that converts reciprocating movements of the arm lever into a unidirectional rotation of the output end.

3. A human-powered system as defined in claim 2 wherein the converter is coupled to a reverse gearbox configured to move from a first position to a second position, wherein, when in the first position, rotation of the output end is provided in a first direction and when in the second position, rotation of the output end is provided in a second direction, opposite the first direction.

4. A human-powered-system as defined in claim 1 wherein the arm lever is telescoping comprising at least two telescoping sections one being a lower section and the other being an upper section that have free linear movement and maintain rotational unity.

5. A human-powered-system as defined in claim 1 further comprises an output wheel axially coupled to said output end comprising one of a chain ring, a spur gear, or a pulley.

6. A human-powered-system as defined in claim 1 further comprises a support bracket that supports at least said converter and pivotally supports the fulcrum point of said reciprocating member.

7. A human-powered-system as defined in claim 1, wherein the rack link comprises:
    a cogwheel having a plurality of cogs axially supported by said input end of said converter;
    a pushrod that intermeshes with said cogs of said cogwheel;
    a pivot joint attached to one end of said pushrod that pivotally attaches to said arm lever; and
    a pushrod guide linearly supporting said pushrod and maintaining proper contact and alignment with said cogwheel.

8. A human-powered-system as defined in claim 1 wherein said slide mechanism comprises;
    a rotary collar freely supported on an upper section of said arm lever;
    a lock collar coupled to the upper section on each end of said rotary collar to restrict linear movement and allow for free rotational movement; and
    a slide, coupled at one end to said rotary collar, linearly supported by said reciprocating member in such a manner as to allow for free linear movement.

9. A human-powered-system as defined in claim 1, further comprising a pedal crank assembly capable of working separately and in conjunction with said arm lever and operatively linked to said output end of said converter, comprising:
    a crank set supporting at least one gear ratio and pedals;
    an extension comprising at least one length of sufficiently rigid material that rotationally supports said crank set; and
    a freewheel sprocket axially coupled to said output end of said converter and operatively linked to said crank set.

10. A human-powered-system as defined in claim 1 wherein said controller is a u-joint controller comprising:
- a universal joint having an upper half and a lower half, wherein said upper half is axially coupled to said lower section of said arm lever and said lower half axially supports a stub shaft;
- at least one pitman arm, capable of supporting at least one pushrod, coupled to said lower half of said universal joint at said first connection point; and
- at least one tie rod comprising an elongated piece of sufficiently rigid material with a pivot joint on each end.

11. A human-powered-system as defined in claim 10, further comprising a support bracket comprising:
- a pivot support pivotally supporting said arm lever at the fulcrum point pivotally supporting said stub shaft of said universal joint in such a manner that ensure proper function of said universal joint while said arm lever is being reciprocated and rotated;
- a support post comprising at least one lengthy piece of sufficiently rigid material that is fixed near one end to said pivot support; and
- a slide support that attaches to said converter and adjustably supported by said support post.

12. A human-powered-system as defined in claim 1 wherein said controller is a cable controller comprising:
- first and second cables;
- a cable support bracket coupled to the reciprocating member and supporting the first and second cables; and
- a cable rotary member rotationally coupled to a lower section of the arm lever to rotate therewith, the cable rotary member coupled to the first and second cables to transfer rotary motion of the arm lever to the first and second cables.

13. A human-powered-system as defined in claim 1, further comprising a vehicle support, comprising:
- a frame;
- a plurality of wheels;
- at least one of said plurality of wheels is a drive wheel supporting at least one gear ratio operatively supported near one end of said frame and operatively linked to said output end of said converter to propel said vehicle support forward;
- at least two of said plurality of wheels are steerable wheels laterally spaced and pivotally supported by said frame near the end opposite the said drive wheel and operatively linked to said control means to act upon the steering commands of said operator and alter the direction of travel;
- a seat supported upon said frame to support said operator; and
- at least one type of a hand lever activated bicycle braking system operatively connected to at least one of said plurality of wheels.

* * * * *